United States Patent
Wiese et al.

(10) Patent No.: US 7,190,693 B2
(45) Date of Patent: Mar. 13, 2007

(54) METHOD, SYSTEM AND APPARATUSES FOR TRANSFERRING AUDIO AND/OR VIDEO SIGNALS BETWEEN SYNCHRONOUS AND ASYNCHRONOUS NETWORK AND FOR MINIMIZING DELAY TIME IN SUCH NETWORKS

(75) Inventors: Detlef Wiese, Freising (DE); Joerg Rimkus, Flensburg (DE)

(73) Assignee: Mayah Communications GmbH, Hallbergmoos (DE)

( * ) Notice: Subject to any disclaimer, the term of this patent is extended or adjusted under 35 U.S.C. 154(b) by 6 days.

(21) Appl. No.: 10/513,970

(22) PCT Filed: May 9, 2003

(86) PCT No.: PCT/EP03/04877

§ 371 (c)(1),
(2), (4) Date: Apr. 27, 2005

(87) PCT Pub. No.: WO03/096639

PCT Pub. Date: Nov. 20, 2003

(65) Prior Publication Data

US 2005/0226255 A1    Oct. 13, 2005

(30) Foreign Application Priority Data

May 10, 2002   (EP)   .................................. 02010590

(51) Int. Cl.
*H04L 12/56* (2006.01)

(52) U.S. Cl. ..................... 370/352; 370/252; 379/88.17
(58) Field of Classification Search ................ 370/466, 370/467, 503, 386, 400, 401, 352–356, 229, 370/252, 521; 379/93.05, 88.17; 709/203; 375/240.13

See application file for complete search history.

(56) References Cited

U.S. PATENT DOCUMENTS

2002/0031086 A1 * 3/2002 Welin .......................... 370/229
2005/0089052 A1 * 4/2005 Chen et al. .................. 370/401

* cited by examiner

Primary Examiner—John Pezzlo
(74) Attorney, Agent, or Firm—Levine & Mandelbaum

(57) ABSTRACT

A method and apparatus for transferring/receiving audio and/or video signals for bridging synchronous and asynchronous networks and minimizing delay time over such networks including analysing the active network interface for determining the network interface that is receiving and/or sending data, taking a multiplexed synchronous-clock signal from the network and providing it to a bitstream analyser, analysing the format of a multiplexed signal obtained from another audio codec, analysing the audio format, adapting the ISDN network clock to the IP network clock for forming a clock-adapted digital signal, encoding the digital signal, adapting the encoded signal to IP datagrams, and, inserting the datagram signal in the IP network.

5 Claims, 3 Drawing Sheets

METHOD, SYSTEM AND APPARATUSES FOR TRANSFERRING AUDIO AND/OR VIDEO SIGNALS BETWEEN SYNCHRONOUS AND ASYNCHRONOUS NETWORK AND FOR MINIMIZING DELAY TIME IN SUCH NETWORKS

BACKGROUND OF THE INVENTION

The present invention refers to a method for transferring/receiving audio and/or video signals fulfilling the requirement to bridge synchronous and asynchronous networks and minimizing delay time over such networks.

It is known that during the last two decades audio transmission has been dominated by the high market penetration of dedicated and dial-up networks, such as E1, ISDN and fixed rate digital networks. In particular for live, but also for contribution and distribution, audio codecs (including encoder and decoder as well as network interfaces) are used via dial-up and dedicated lines for the purpose of encoding to reduce the bit rate and to adapt the digital signal to the network needs. Typically the applied bit rates are 56/64 kbps up to 2 Mbit/s.

In connection with the continuing process of integration and digitalization, in particular the high investments in LAN/WAN environments, a concept of audio gateway codecs with new possibilities is introduced: flexible use of data capacity by changing parameters like quality, bit rate and delay time of the digital audio signal. In ATM networks, high capacities can be used to transmit linear high quality audio without nearly any delay time. During high network traffic and due to more programs audio, may be coded with MPEG or other algorithms.

Furthermore high attention is given to an important issue for the broadcasting industry: compatibility between transmission and reception devices.

While at the end of 1992 MPEG 1 has been already standardized, other previously developed algorithms for compressed audio have been used in the eighties—first of all with an emphasis on speech.

Beside many advantages using the MPEG-algorithms, such as bit rate reduction, possibility to vary parameters such as bit rate, quality, delay time, there are disadvantages such as reduced number of encodes/decodes, so called cascadings, introduction of necessary n-1-mixing-technique for the area of monitoring in order to provide the possibility for reporters to hear themselves via headphone on air as well as the dramatically reduced possibilities to control quality, because typically there is no information about the already used bit rates of previous transmissions/storages, so called generations.

Up to the mid of the nineties, MPEG has been introduced in the area of audio transmission/reception, processing and storage. Later, a focus on certain applications has resulted in the use of more and more linear audio coding for recording/archiving, production.

An overview of applications and coding algorithm is given in Table 1 with additional information of the mainly used audio coding scheme. In addition to MPEG, other coding algorithms have to be considered.

TABLE 1

| Application | Applied coding scheme |
| --- | --- |
| Archiving | Linear/apt-X |
| Broadcast automation | MPEG/Linear |

TABLE 1-continued

| Application | Applied coding scheme |
| --- | --- |
| Interim storage | MPEG/Linear |
| Audio-On-Demand | MPEG |
| Reporting | MPEG |
| Contribution | MPEG/J.41/Linear/apt-X |
| Distribution | MPEG/J.41/Linear/apt-X |

The audio scheme highly demanded is the linear audio coding for communication and storage due to extremely low delay time and high quality. Additionally, linear audio coding allows cascading. Alternatively, there can be used other algorithms, which are based on reduction of redundancy and also provide a low coding delay time, e.g. apt-X. In particular for applications in communications, low bit rate coding schemes are the preferred ones, because this is the only way to transmit signals in a cost effective way.

Applications of IP (Internet Protocol)-Audio have not been introduced in professional broadcasting, in particular due to the missing "Quality of Service QoS".

During the last years, two segments of broadcasting and studio applications have been established nearly independently, although a combination might have been more useful: Communications and Production. The FIG. 1 shows the relation between three considered worlds in broadcasting:

Information Technology World (IT Production, LAN/WAN, Internet, Intranet);

Communications World (e.g. ISDN);

Broadcasting World (switching).

When transmitting files, there is no need for real-time, although there are less and more important files to be transmitted. Such files can be transmitted slower or faster than real-time. Until now file transmission is not used for Live-transmissions or On Air events.

As regards the link between Broadcasting-World and Communications World, the real-time transmissions are the most important ones. Input and output signals are routed in a switching room and—depending on bandwidth and destination—are sent via different networks. Many lines, e.g. for distribution to transmitters are used 24 hours 7 days—meaning all the time. Others, e.g. reporting only for a few minutes, e.g. via ISDN. Beside the fact that Live signals have to be considered, the overall coding delay obtains high attention.

If audio signals from LAN/WAN-networks of IT World need to be transmitted in real-time (live), typically the Broadcasting World is chosen and practically is used the chain shown in FIG. 2.

For the popular case, that a reporting shall be recorded, is chosen the chain shown in FIG. 3.

While in the first case, probably a already encoded file needs to be decoded first of all, in order to be transmitted via linar digital or analog and then needs to be input into another encoder for encoding purposes, the second example might even result in a signal being received via ISDN as MPEG signal, being decoded by the decoder to a linear signal and than being stored, e.g. as DAT and later being brought into the LAN and then probably again will be encoded into an MPEG file and stored on a server.

Both examples show cascading, integration of complex technique and thus high costs and investments.

A classification and consideration of the impact of delay time for various applications has been made. Table 2 shows applications which have requirements to delay time. There are advantages and disadvantages to use MPEG-algorithms, as well as algorithms, such as apt-X.

TABLE 2

| Application | Requirement | Pro-/Con with MPEG | | Altern. algorithm |
|---|---|---|---|---|
| Monitoring | <20 ms | + | cost for n-1-mix | Linear, J.41, J.57, apt-X |
| Interview | <80 ms | + | cost | Linear, J.41, J.57, apt-X G.722 quality with 7 k too low |
| | | − | Delay high | |
| Reporting | <80 ms | + | cost | Linear, J.41, J.57, apt-X G.722 quality with 7 k too low |
| | | + | Asymm. Codec | |
| Distribution | >>100 ms | + | cost | Linear, J.57, Enhanced-apt-X |
| | | + | quality | |
| | | − | cascading | |
| Contribution | >>100 ms | + | cost | Linear, J.57, Enhanced-apt-X |
| | | + | quality | |
| | | − | cascading | |
| Emission | >>100 ms | + | bandwidth | |
| | | + | quality | |

There are principally differences: while MPEG includes system delay always, apt-X includes only very short delay time. There are also differences within the MPEG-standards, e.g. between Layer 2 and 3, between MPEG 1 and 2.

Today there are no professional audio codec devices fulfilling the requirement to bridge synchronous and asynchronous networks and the requirements of low delay.

SUMMARY OF THE INVENTION

Aim of the present invention is to overcome the above described drawbacks and to transfer audio and/or video signals fulfilling the requirement to bridge synchronous and asynchronous networks and minimizing delay time over such networks.

For achieving such aims the present invention has as its object a method/system and apparatuses for transferring/receiving audio and/or video signals fulfilling the requirement to bridge synchronous and asynchronous networks and minimizing delay time over such networks, having the distinctive features described in claim 1 and further defined by sub-claims.

Further aims and advantages of said invention will result in being clearer from the detailed description that follows and annexed drawing supplied as an explicative and non-limiting example.

Only for practical reasons, the example described refers to a method of transmission and reception of audio signals over ISDN networks and Internet Protocol networks, but the same principles are applied also to video signals and to other synchronous and asynchronous networks.

As example, we consider that two audio devices A and B are connected via ISDN and a Live audio transmission is performed via this ISDN connection. At the reception B, the audio should be stored into a digital storage on the LAN.

DESCRIPTION OF THE PREFERRED EMBODIMENT

Figure 1:
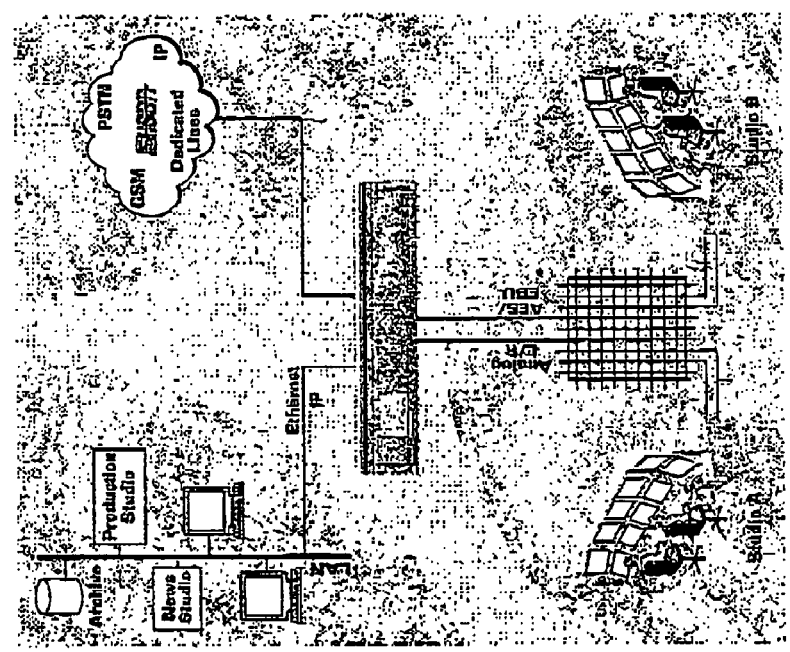
FIG. 1 is a flow diagram illustrating the environment of the invention.
Figure 2:
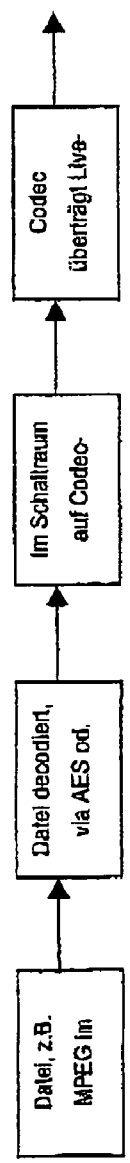
FIG. 2 is a partial schematic signal flow block diagram.
Figure 3:
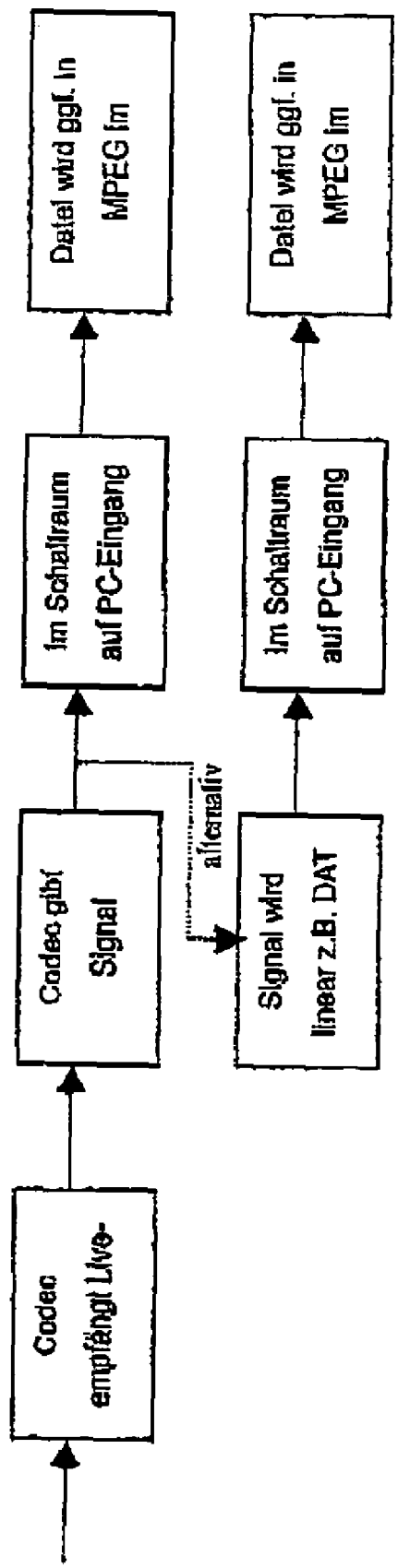
FIG. 3 is a further partial schematic signal flow block diagram.
Figure 4:
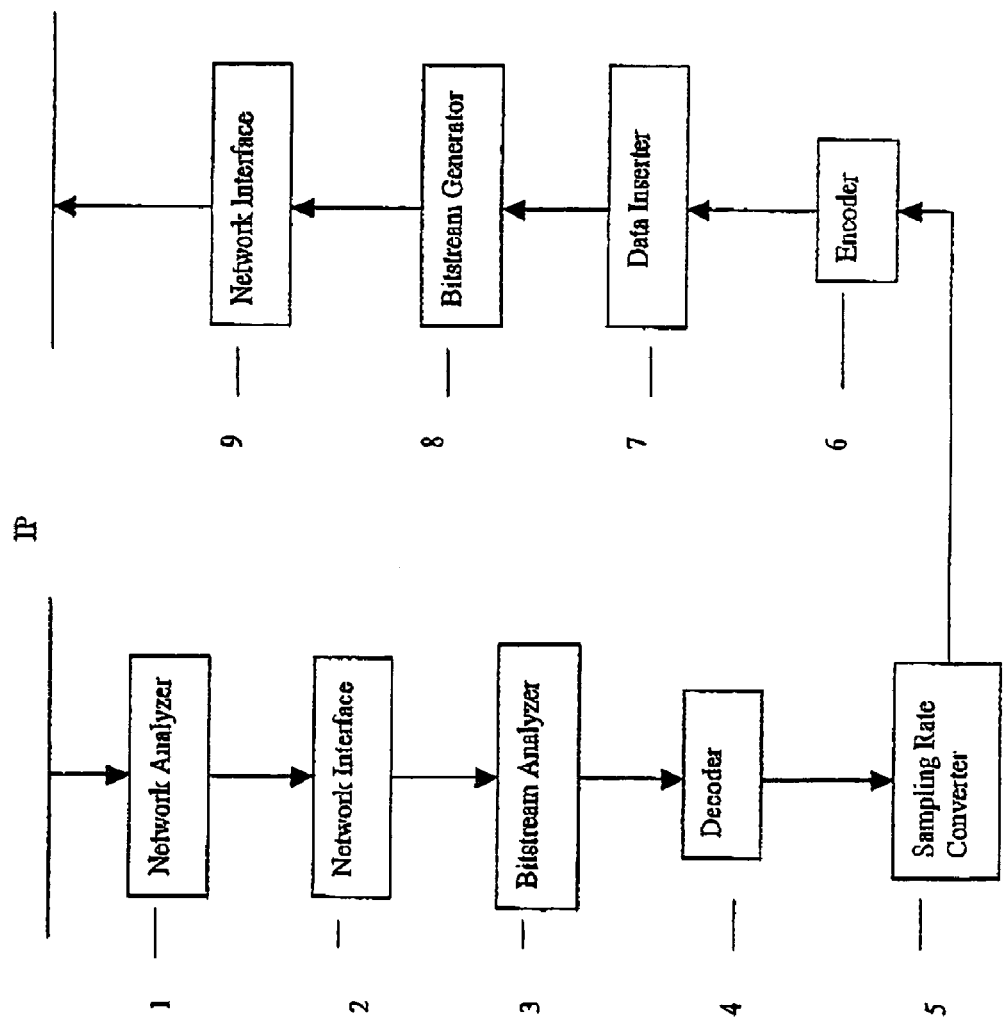
FIG. 4 represents a block diagram of audio gateway codec function according to the invention.

The system consists of the following parts which may be set in sequence or in another order to define certain applications, where, on the reception side of the apparatus:

With 1 is indicated a network analyser which analyses the active network interface or verifies which network interface is receiving and/or sending data;

With 2 is indicated a network interface (e.g. a synchronous network like ISDN) which takes a synchronous-clock signal (multiplexed signal) from the network and provides it to a bitstream analyser 3;

With 3 is indicated a bitstream analyser for analysing the format of the multiplexed signal obtained from another audio codec (e.g. Inverse Multiplexing);

With 4 is indicated a decoder(s) analysing the audio format, e.g. MPEG 1 Layer 3 128 kBit/s stereo (for instance, according to German Patent Application DE 19727938 of Jan. 7, 1997 and PCT Patent Application WO 99/01948)

With 5 is indicated a sampling rate converter needed for adapting the ISDN network clock to the IP network clock and resulting in a clock-adapted digital signal;

on the transmission side of the apparatus:

With 6 is indicated an Encoder(s) to encode the digital signal;

With 7 is indicated a data inserter which may be used to insert additional data, either within the encoded signal or in a separated stream; alternatively the data inserter may be used to replace less significant bits of the encoded signal with such additional data (i.e. in the way described in German patent application DE 44 30 864);

With 8 is indicated a bitstream generator to adapt the encoded signal to the IP datagrams as required by the network interface and by the network itself in terms of protocols, packet size, etc. and resulting in a datagram signal;

With 9 is indicated a network interface which takes the datagram signal and puts it in the IP network, e.g. 100 Mbit/s Ethernet;

The characteristics of the described methods, object of the present invention, result clear from the present description and annexed drawing.

The advantages of the method object of the present invention also become clear from the description.

They consist in the fact that method described uses various encoding algorithms, for instance G.711, G.722, MPEG Audio Layer 2 and 3, AAC, CT-AACPlus, etc., provides a single-processor solution, using a real-time operating system, allowing the connection among various network interfaces, like ISDN, E1, T1, X.21, PSTN, Ethernet, etc.

For audio in and/or output typically A/D, D/A or digital AES/EBU or SPDIF components are used. While sampling rate converters are typically implemented using existing ICs, encoder and decoder are implemented on one or more DSPs, the selection of the DSP is determined by the processing power required by a certain algorithm which shall run on the system. Bigger upgrades, in particular with more complex algorithms can not be realized without hardware change.

The power of scalar processors, e.g. such as Intel based processors, today even are sufficient for complex audio coding algorithms. The core elements of the demanded platform which deletes the disadvantages mentioned above are powerful processor, standardized bus system, no dedicated hardware, where possible, and flexibility due to mainly software development.

Such device is able to receive via one interface and send via another simultaneously or send via one interface and receive via another interface. This includes the possibility to receive via a synchronous, e.g. ISDN, E1 or T1 or X.21 and to send via an asynchronous network, such as Ethernet, LAN/WAN by sending packets: e.g. two audio devices are connecting A and B via ISDN and a Live audio transmission is performed via this ISDN connection. At the reception part, the audio is stored or streamed into the LAN/WAN environment.

It also clear that numerous variants can be supplied by the skilled man to the method for transferring audio and/or video signals and minimizing delay time over Internet networks and relating apparatuses described as an example, without however departing from the novelty principles inherent in the present invention.

The invention claimed is:

1. Method for transferring/receiving audio and/or video signals fulfilling the requirement to bridge synchronous and asynchronous networks and minimizing delay time over such networks comprising:
    analysing an active network interface or verifying which network interface is receiving and/or sending data;
    taking a synchronous-clock signal from the network and providing said synchronous-clock signal to a bitstream analyser;
    analysing a format of a multiplexed signal obtained from an audio codec;
    analysing an audio format;
    adapting an ISDN network clock to an IP network clock, and resulting in a clock-adapted digital signal;
    encoding said clock-adapted digital signal;
    adapting the encoded clock-adapted digital signal to IP datagrams as required by the network interface and by the active network itself in terms of protocols and packet size, resulting in a datagram signal; and
    taking the datagram signal and putting the datagram signal in an IP network.

2. Method for transferring/receiving audio and/or video signals fulfilling the requirement to bridge synchronous and asynchronous networks according to claim 1, wherein a data inserter is used to insert additional data, either within the encoded signal or in a separated stream, or, alternatively, used to replace less significant bits of the encoded signal with such additional data.

3. Apparatus for transferring audio and/or video signals fulfilling the requirement to bridge synchronous and asynchronous networks comprising
    means for analysing an active network interface or verifying which network interface is receiving and/or sending data;
    means for taking a synchronous-clock signal from the network and providing the synchronous-clock signal to a bitstream analyser;
    means for analysing a format of a multiplexed signal obtained from an audio codec;
    means for analysing an audio format;
    means for adapting an ISDN network clock to an IP network clock and resulting in a clock-adapted digital signal;
    means for encoding said clock-adapted digital signal;
    means for adapting the encoded clock-adapted digital signal to IP datagrams as required by the active network interface and by the network itself in terms of protocols and packet size, and resulting in a datagram signal; and
    means for taking the datagram signal and putting the datagram signal in an IP network.

4. Apparatus for receiving audio and/or video signals fulfilling the requirement to bridge synchronous and asynchronous networks for the reception of audio and/or video signals and minimizing delay time over Internet networks comprising
    means for analysing an active network interface or verifying which network interface is receiving and/or sending data;
    means for taking a synchronous-clock signal from a network and providing said synchronous-clock signal to a bitstream analyser.
    means for analysing a format of a multiplexed signal obtained from an audio codec;
    means for analysing an audio format;
    means for adapting an ISDN network clock to an IP network clock and resulting in a clock-adapted digital signal;
    means for encoding said clock-adapted digital signal;
    means for adapting the encoded clock-adapted digital signal to IP datagrams as required by the active network interface and by the network itself in terms of protocols and packet size, and resulting in a datagram signal; and
    means for taking the datagram signal and putting the datagram signal in an IP network.

5. System for transferring/receiving audio and/or video signals fulfilling the requirement to bridge synchronous and asynchronous networks for transferring/receiving audio and/or video signals and minimizing delay time over Internet networks comprising
    means for analysing an active network interface or verifying which network interface is receiving and/or sending data;
    means for taking a synchronous-clock signal from a network and providing said synchronous-clock signal to a bitstream analyser;
    means for analysing a format of a multiplexed signal obtained from an audio codec;
    means for analysing an audio format;
    means for adapting an ISDN network clock to an IP network clock and resulting in a clock-adapted digital signal;
    means for encoding said clock-adapted digital signal;
    means for adapting the encoded clock-adapted digital signal to IP datagrams as required by the active network interface and by the network itself in terms of protocols and packet size, and resulting in a datagram signal; and
    means for taking the datagram signal and putting the datagram signal in an IP network.

* * * * *